United States Patent [19]

Harasaki et al.

[11] Patent Number: 4,750,780
[45] Date of Patent: Jun. 14, 1988

[54] DASH PANEL CONFIGURATION FOR A MOTOR VEHICLE FRONT BODY STRUCTURE

[75] Inventors: Hayatsugu Harasaki; Tadashi Ioka, both of Hiroshima, Japan

[73] Assignee: Mazda Motor Corporation, Hiroshima, Japan

[21] Appl. No.: 854,587

[22] Filed: Apr. 22, 1986

[30] Foreign Application Priority Data

| Apr. 23, 1985 | [JP] | Japan | 60-61403[U] |
| Apr. 23, 1985 | [JP] | Japan | 60-61405[U] |
| Apr. 23, 1985 | [JP] | Japan | 60-61406[U] |
| Apr. 27, 1985 | [JP] | Japan | 60-91593[U] |

[51] Int. Cl.$^4$ ................................. B62D 25/08
[52] U.S. Cl. .................... 296/192; 296/194
[58] Field of Search ............ 296/192, 194, 191, 208, 296/209, 29, 30, 70, 84 A, 84 D; 98/2.07, 2.16, 2.17

[56] References Cited

U.S. PATENT DOCUMENTS

| 3,118,362 | 1/1964 | Suisse | 98/2.17 |
| 3,289,564 | 12/1966 | De Castelet | 98/2.07 |
| 3,683,783 | 8/1972 | Pedrani | 98/2.07 |
| 4,466,654 | 8/1984 | Abe | 296/194 X |
| 4,470,341 | 9/1984 | Hirukawa | 98/2.16 |

FOREIGN PATENT DOCUMENTS

| 510004 | 11/1952 | Italy | 296/192 |
| 57-37087 | 2/1982 | Japan . | |
| 104470 | 6/1982 | Japan | 296/192 |
| 221709 | 12/1983 | Japan | 98/2.16 |
| 224863 | 12/1983 | Japan | 296/192 |
| 14576 | 1/1984 | Japan | 296/192 |

Primary Examiner—Johnny D. Cherry
Assistant Examiner—R. Stormer
Attorney, Agent, or Firm—Fleit, Jacobson, Cohn & Price

[57] ABSTRACT

A motor vehicle front body structure including a dash panel separating the engine compartment from the passenger compartment. The dash panel has an upper portion which is inclined forward at an transversely intermediate portion and rearward at the transversely opposite end portions so that the upper edge portion of the dash panel has a forwardly convex configuration to conform with a corresponding configuration of the lower edge of the windshield glass.

16 Claims, 10 Drawing Sheets

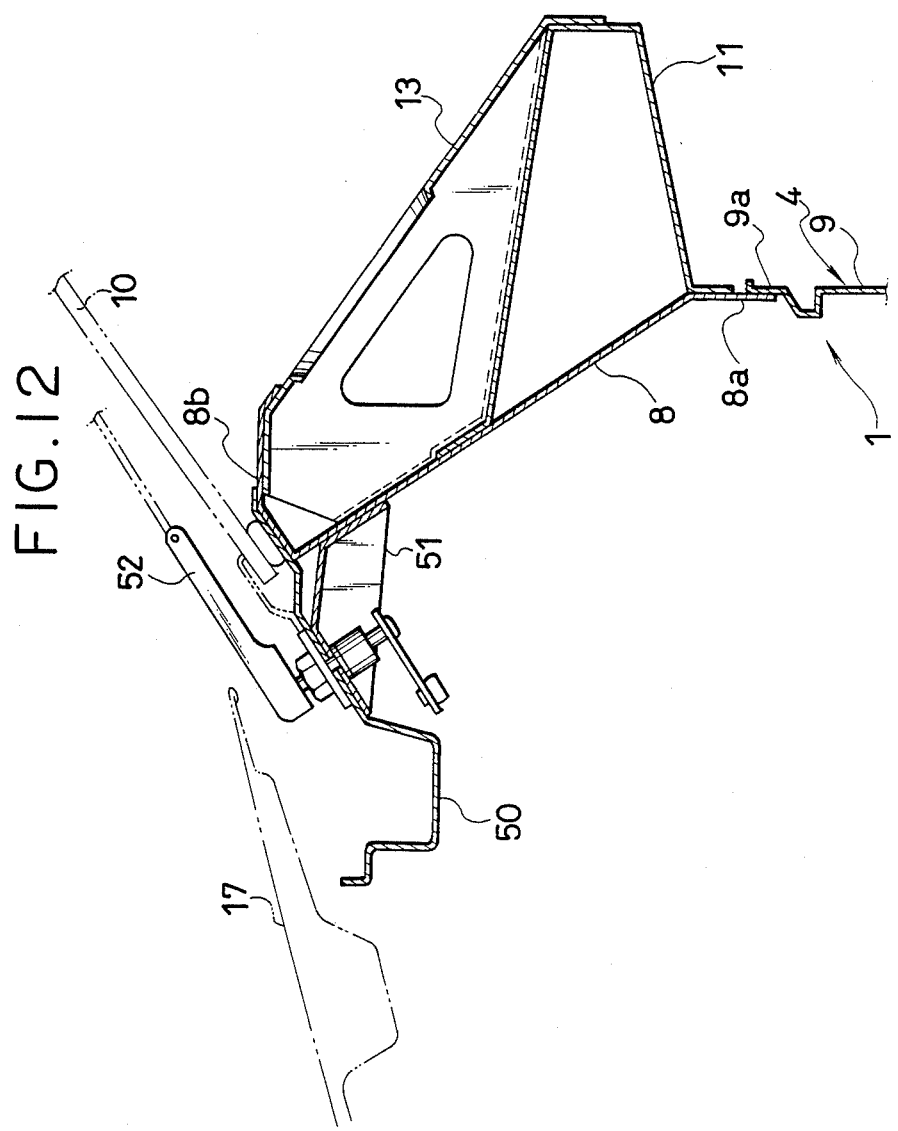

DASH PANEL CONFIGURATION FOR A MOTOR VEHICLE FRONT BODY STRUCTURE

BACKGROUND OF THE INVENTION

1. Field of the Invention

The present invention relates to a motor vehicle body structure and, more particularly, to a front body structure of a motor vehicle of a front engine type.

2. Description of the Prior Art

In motor vehicles of a front engine type, the body structure has a dash panel which separates the front engine compartment from the near passenger compartment. Above the dash panel, there is a front windshield so that the dash panel is structured to support the lower edge portion of the windshield. For the purpose, there is formed a cowl structure which is of a closed cross-sectional configuration and extends substantially transversely along the upper end portion of the dash panel to support the lower edge of the windshield.

In the aforementioned conventional vehicle body structure, problems have been encountered in that the front windshield glass is of a curved configuration having a forwardly convex curvature. In order that the cowl structure be able to support such curved windshield glass, the structure is constructed to possess a width or fore-and-aft dimension which is sufficient to accommodate for the curved lower edge portion of the windshield glass. On Examples of the vehicle front structure are shown in Japanese utility model laid-open No. 57-37087 and the utility model publication No. 57-11813. Such conventional structure is however disadvantageous in that both the engine compartment and the passenger compartment are restricted in available space due to the cowl structure. More specifically, in the side portions, only the rear portion of the cowl structure is used to support the windshield whereas, in the central portion, only the front portion is effectively used to support the windshield. Thus, the remaining portions of the cowl structure is considered as simply decreasing available spaces in the engine and passenger compartments.

SUMMARY OF THE INVENTION

It is therefore an object of the present invention to provide a vehicle front body structure in which a front windshield glass of a forwardly convex configuration can be supported above a dash panel without decreasing the available spaces in the engine and passenger compartments.

Another object of the present invention is to provide a vehicle front body structure wherein the access to the engine compartment is facilitated.

A further object of the present invention is to provide a vehicle front body structure which has an air box structure above the dash panel for ventilation and/or air conditioning.

According to the present invention, the above and other objects can be accomplished by a motor vehicle front body structure including an engine compartment and a passenger compartment rearward the engine compartment, a substantially vertical, transversely extending dash panel separating the engine compartment from the passenger compartment, a front windshield disposed above said dash panel and defining an upper front part of the passenger compartment, said front windshield being, in a horizontal section, of a forwardly convex configuration, said dash panel having an upper portion which is inclined forward at a transversely intermediate part and inclined rearward at the transversely opposite side parts, means for supporting a lower edge portion of said windshield on said upper portion of the dash panel. A reinforcement may be provided so as to cooperate with the upper portion of the dash panel to form a transversely extending structure of a closed cross-section. In front of the upper portion of the dash panel, there may be provided a cowl panel which covers a rear upper part of the engine compartment and which may be removably attached to the vehicle body for providing an access to the engine compartment.

The above and other objects and features of the present invention will become apparent from the following description of preferred embodiments taking reference to the accompanying drawings.

BRIEF DESCRIPTION OF THE DRAWINGS

FIG. 12 is a sectional view similar to FIG. 4 but showing a further embodiment.

DESCRIPTION OF THE PREFERRED EMBODIMENT

Figure 1:
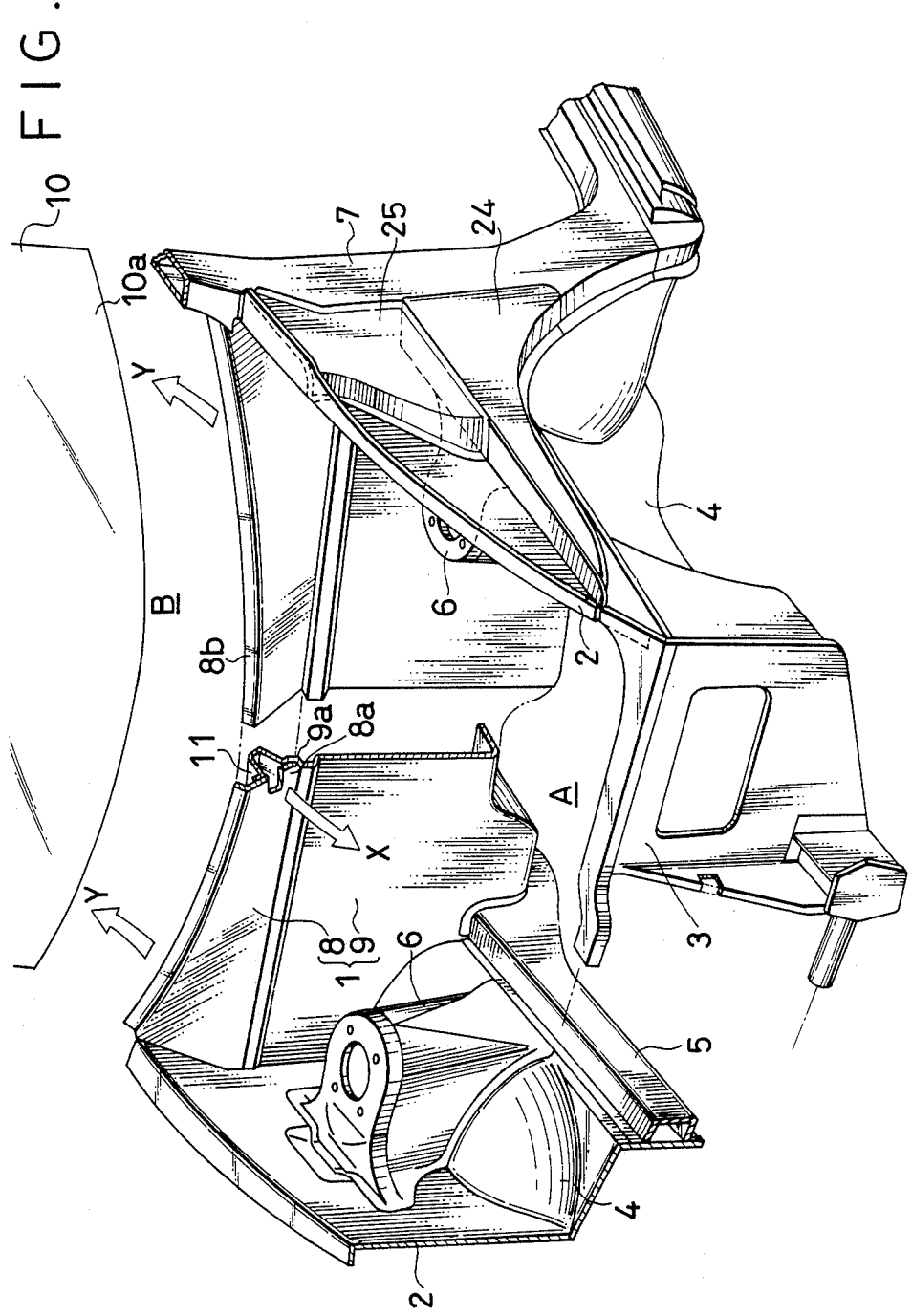
FIG. 1 is a fragmentary perspective view of a vehicle front body structure having a dash panel made in accordance with one embodiment of the present invention.

Referring to the drawings, particularly to FIG. 1, there is shown a motor vehicle body structure including a dash panel 1 which defines a rear wall of an engine compartment A and a front wall of a passenger compartment B. At each end portion of the dash panel 1, there is a wheel apron 2 which extends forward from the dash panel 1 along each side of the engine compartment A. The front end of the wheel apron 2 is connected with a radiator shroud 3 which extends substantially transversely between the front ends of the wheel aprons 2. It will therefore be understood that the front wall of the engine compartment is defined by the radiator shroud 3.

In FIG. 1, it will be noted that the wheel apron 2 is formed with a wheel arch 4 which is bulged inward into the engine compartment A. Along the lower edge portion, attached to the wheel apron 2 is a longitudinally extending front frame 5. A suspension tower 6 is also attached to the wheel apron 2 and extends from the front frame 5 upward beyond the wheel arch 4 as well known in the art. It will further be noted that wheel reinforcements 24 and 25 are welded to the wheel apron 2 to reinforce the same.

Figure 3:
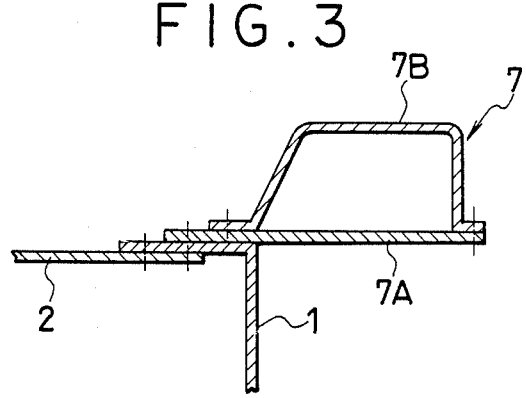
FIG. 3 is a horizontal sectional view showing the connection between the dash panel and the front pillar structure.

At each end of the dash panel 1, there is a front pillar 7 which extends upward from the rear end of each wheel apron 2. As shown in FIG. 3, the front pillar 7 comprises an inner panel 7A and an outer panel 7B which are connected together at the front and rear edge portions to form a structure of a closed cross-section. It will further be noted in FIG. 3 that the end portion of the dash panel 1 and the rear end portion of the wheel apron 2 are connected with the front edge portion of the front pillar 7. A front windshield glass 10 is located in an opening defined between the pillars 7.

Figure 2:
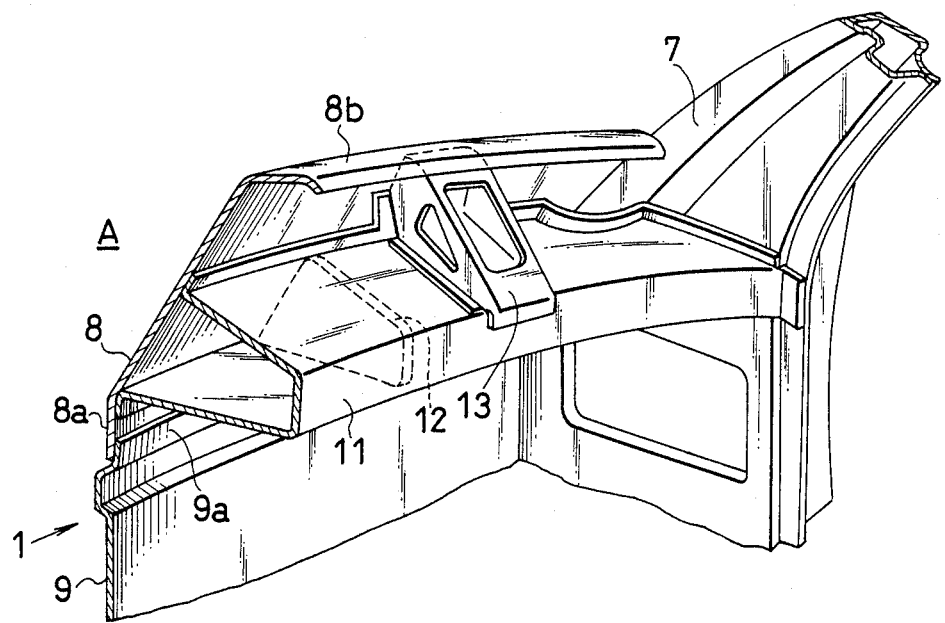
FIG. 2 is a fragmentary perspective view of the structure shown in FIG. 1 as seen from the passenger compartment.
Figure 4:
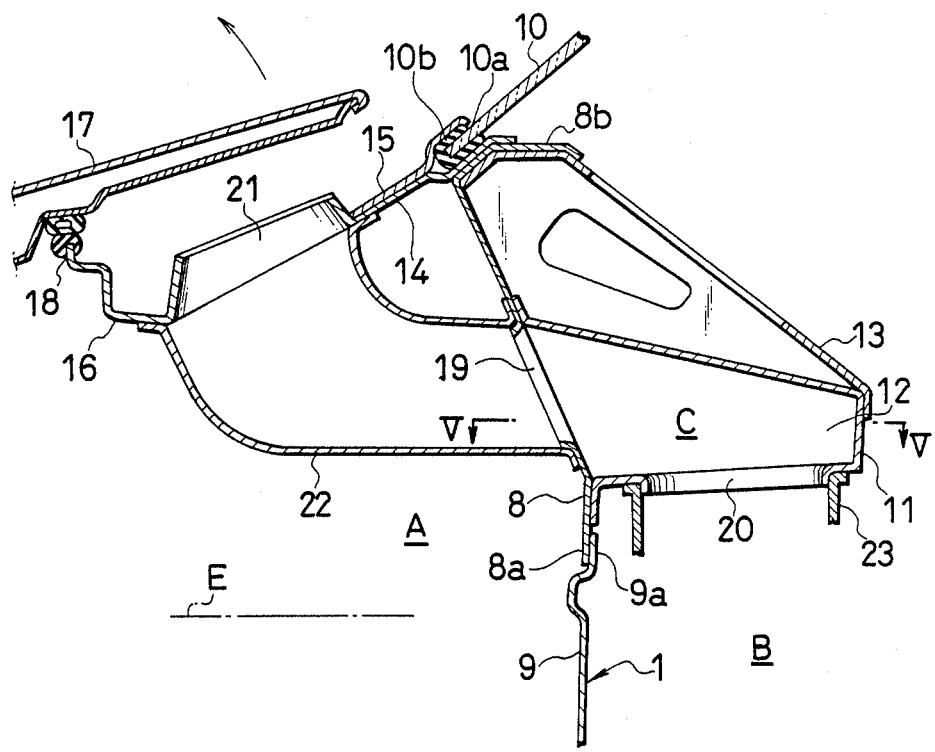
FIG. 4 is a vertical sectional view taken along a plane passing through an intermediate portion of the dash panel.
Figure 5:
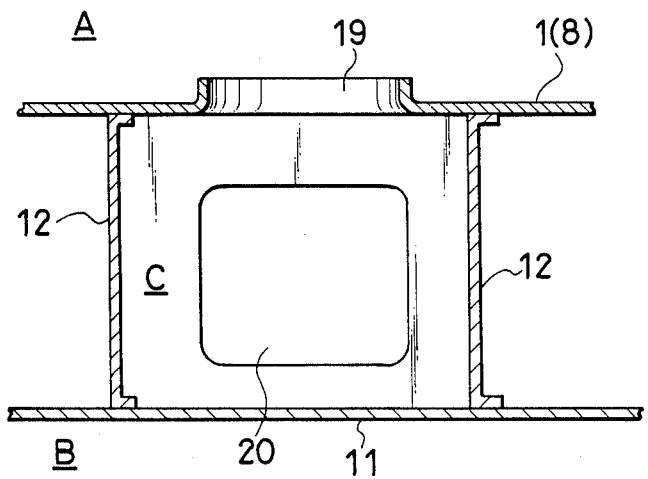
FIG. 5 is a sectional view taken along a line V—V in FIG. 4.

In the illustrated embodiment, the dash panel 1 is comprised of a lower panel section 9 and an upper panel section 8. As shown in FIGS. 2 and 4, the upper panel section 8 has a lower edge portion 8a which extends substantially horizontally at a level higher than the level E of the engine top deck. The lower panel section 9 is of a substantially planar configuration and has an upper edge portion 9a which is laid on and secured to the lower edge portion 8a of the upper panel section 8. The upper panel section 8 is of a three-dimensionally curved configuration and has an intermediate portion inclined forward as shown by an arrow X and opposite end portions inclined rearward as shown by an arrow Y in FIG. 1 so that the upper panel section 8 has an upper edge portion 8b which is of a forwardly convex curved configuration. The curvature of the upper edge portion 8b of the upper panel section 8 conforms substantially with the curvature of the windshield glass 10.

In FIGS. 1, 2 and 4, it will be noted that a transversely extending reinforcement 11 which is of a channeled cross-section and attached to the rear side of the upper panel section 8. The reinforcement 11 forms a transversely extending structure of a closed cross-section to thereby provide the upper panel section 8 with an increased rigidity. In the reinforcement 11, there are provided a plurality of web members 12 which are spaced apart in the transverse direction of the vehicle body and secured to the upper panel section 8 and the reinforcement 11. The web members 12 function to provide the structure made of the upper panel section 8 and the reinforcement 11 with a further rigidity.

It will be understood that the reinforcement 11 is adopted only for the purpose of providing the upper panel section 8 with a desired rigidity so that it may not necessarily have a width or fore-and-aft dimension sufficient to cover the forwardly convex lower edge portion of the windshield glass 10 as in the conventional structure. It should further be noted that the reinforcement 11 is attached to the lower portion of the upper panel section 8 where the curvature is relatively small throughout the length of the panel section 8. This arrangement is advantageous in that the reinforcement 11 can be of a configuration having a relatively small curvature so that the reinforcement 11 can be relatively easily formed.

In FIG. 4, it will be noted that the upper edge portion 8b of the upper panel section 8 is bent rearward. An appropriate number of reinforcements 13 are attached to the upper edge portion 8b of the panel section 8 and the reinforcement 11 at transversely spaced positions.

As shown in FIG. 2, the reinforcement 13 is of a box-shaped configuration and welded to the upper and rear sides of the reinforcement 11. Further, the reinforcement 13 is also welded to the underside of the upper edge portion 8b of the upper panel section 8.

A bracket assembly comprising a lower bracket plate 14 and an upper bracket plate 15 is provided for supporting the lower edge portion 10a of the front windshield glass 10. Referring to FIG. 4, the lower bracket plate 14 is welded at the rear edge portion to the upper portion 8b of the upper panel section 8. Between the rear edge portions of the bracket plates 14 and 15, the lower edge portion 10a of the windshield glass 10 is inserted and supported by the bracket assembly through a seal strip 10b. It should of course be noted that the bracket plates 14 and 15 extends transversely of the vehicle body throughout the length of the upper panel section 8. At the front edge portion, the bracket plate 15 is welded to the bracket plate 14. The bracket plate 14 is extended forward beyond the front edge of the bracket plate 15 to form a rain rail panel 16 which has an air intake hole 21 as shown in FIG. 4. An air duct 22 is provided and has a front end welded to the rain rail panel 16 around the air intake hole 21, the rear end of the air duct 22 being welded to the upper panel section 8 of the dash panel 1. The upper panel section 8 is formed with an air hole 19 which connects the air duct 22 to the inside space of the reinforcement 11. The reinforcement 11 is further formed at the lower side with an air outlet hole 20 which is connected with an air duct 23.

The rain rail panel 16 is bent upward at the front edge portion and provided with a weather strip 18 which is adapted to engage a bonnet panel 17 which covers the engine compartment A. In the reinforcement 11, there are provided an appropriate number of web members 12 which are transversely spaced apart from each other and welded to the reinforcement 11. Two web members 12 located at the opposite sides of the air outlet hole 20 define an air box C in the reinforcement 11. The other web members 12 may be formed with lightening holes.

Figure 6:
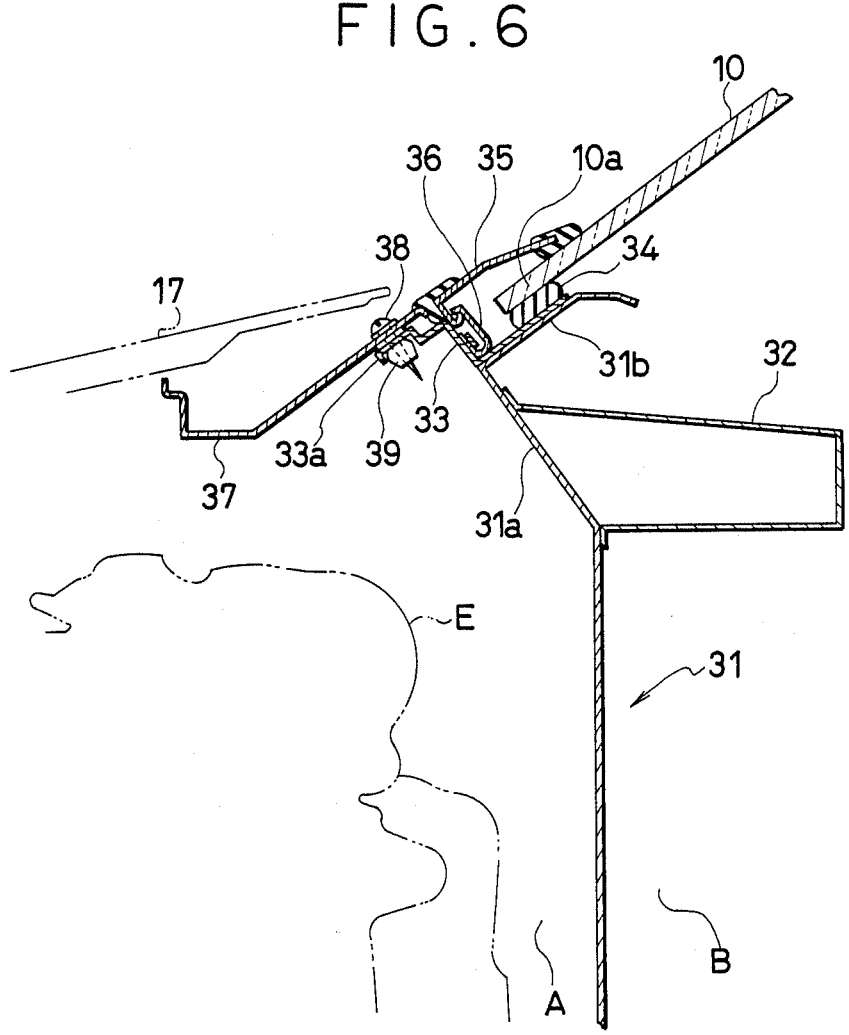
FIG. 6 is a sectional view similar to FIG. 4 but showing another embodiment.
Figure 7:
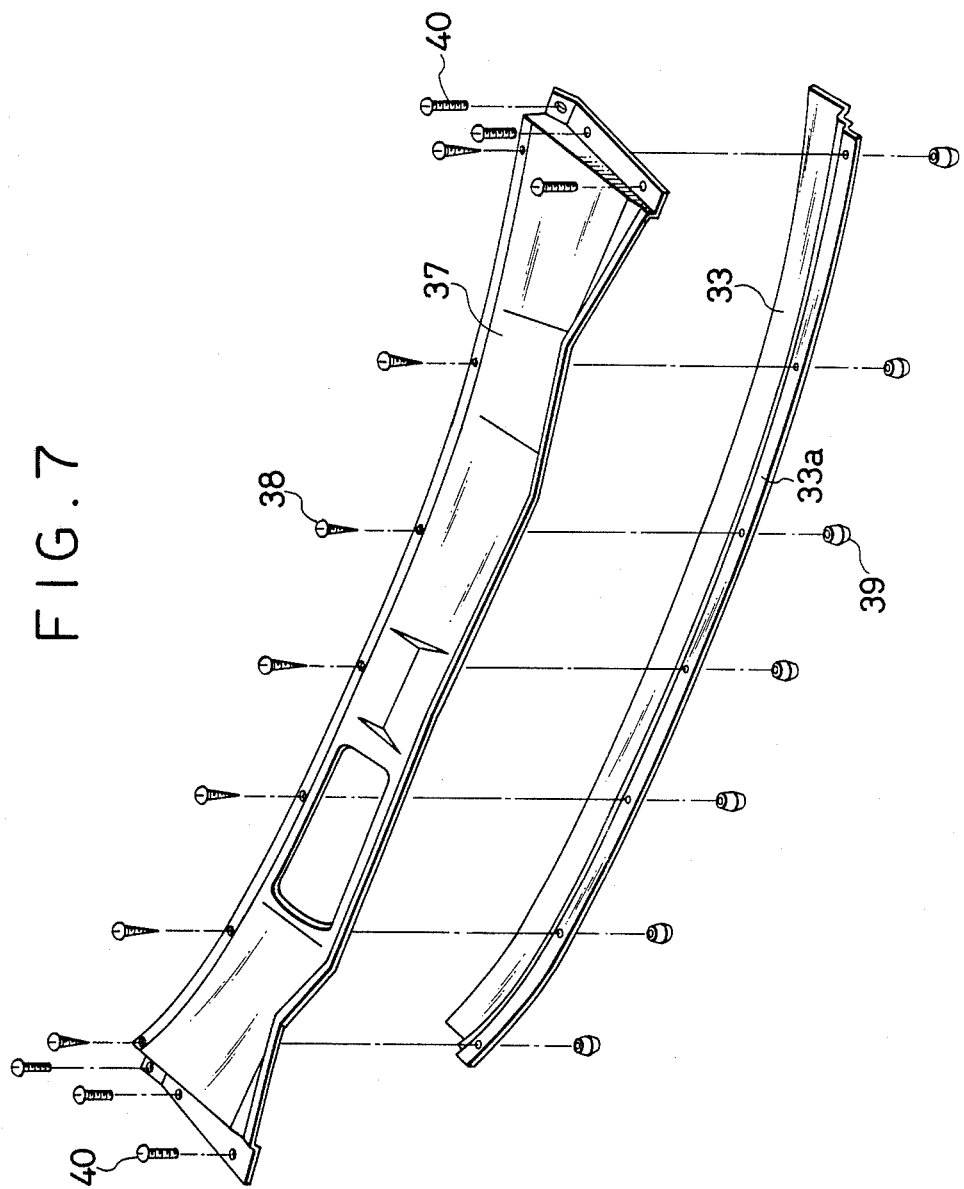
FIG. 7 is an exploded perspective view showing a removable attachment of the cowl panel.
Figure 8:
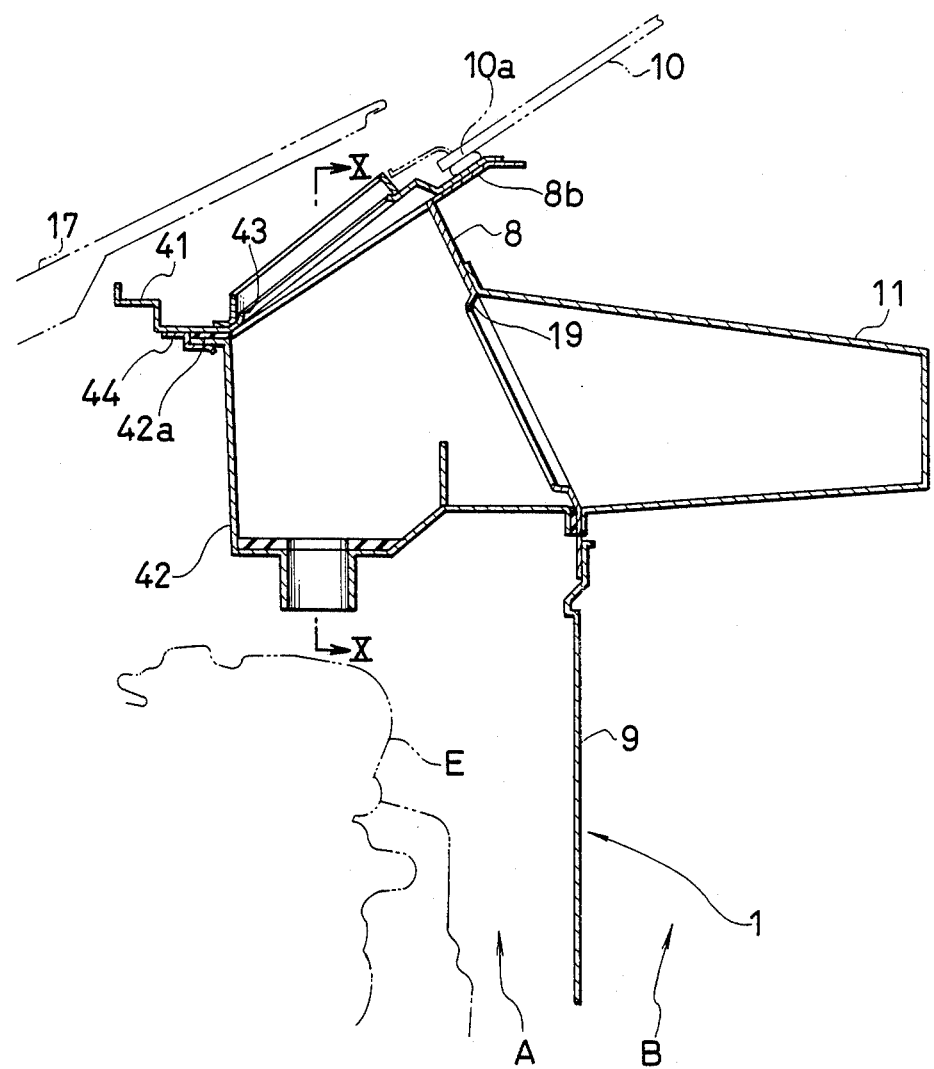
FIG. 8 is a sectional view similar to FIGS. 4 and 6 but showing a further embodiment.
Figure 8A:
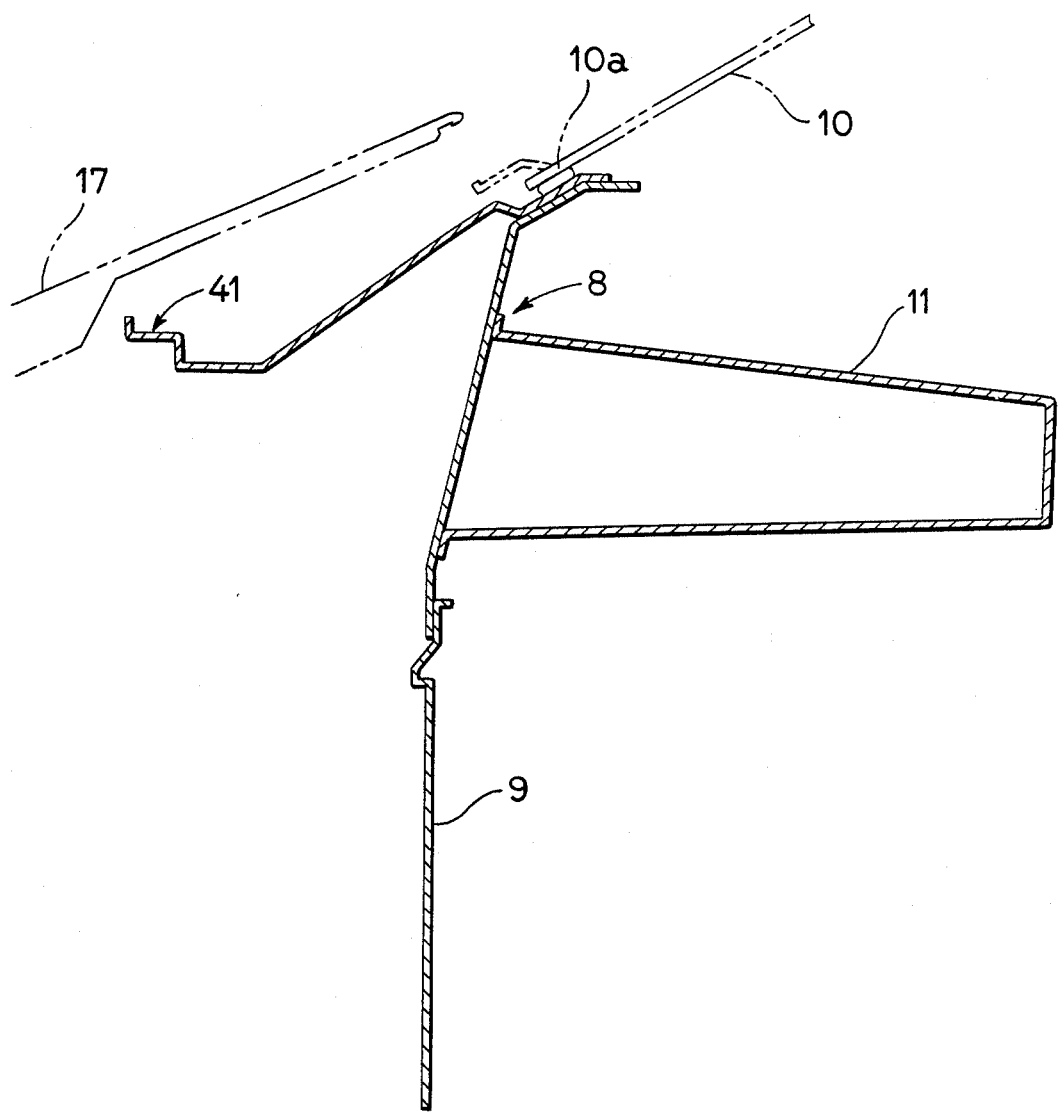
FIG. 8A is a vertical sectional view taken along a plane passing through a side portion of the dash panel.
Figure 9:
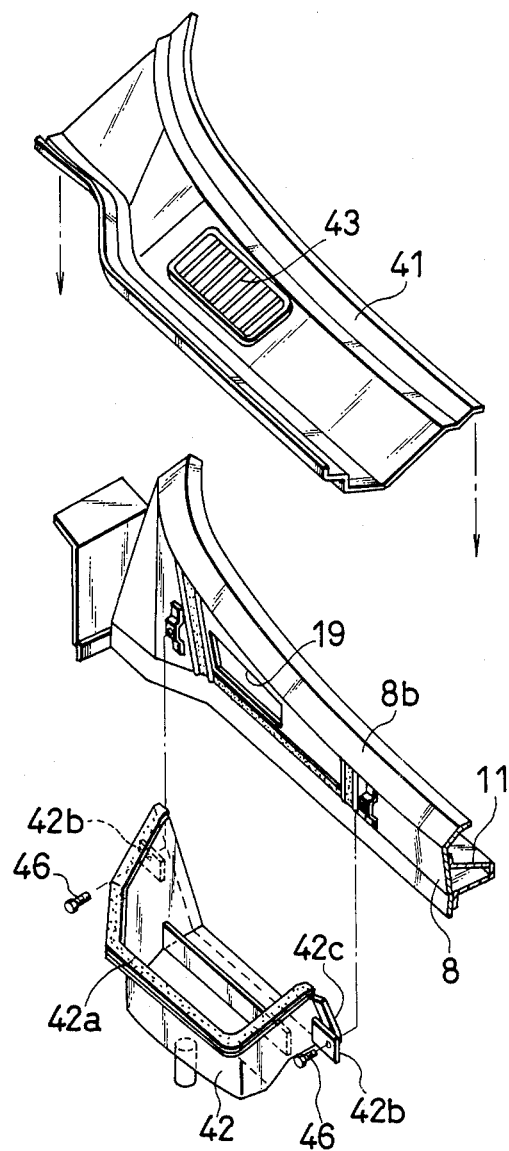
FIG. 9 is an exploded perspective view showing the air box structure in the embodiment shown in FIG. 8.
Figure 10:
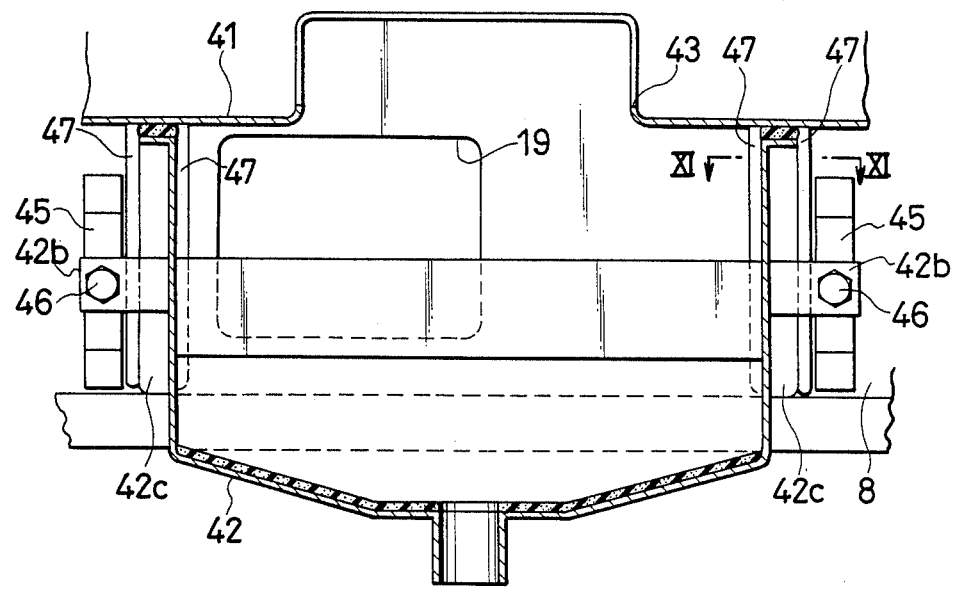
FIG. 10 is a sectional view taken along the line X—X in FIG. 8.
Figure 11:
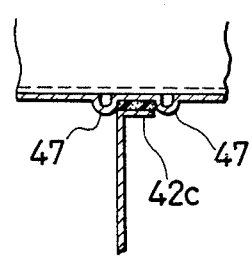
FIG. 11 is a sectional view taken along the line XI—XI in FIG. 10.

Referring now to FIGS. 6 and 7, the embodiment shown therein includes a dash panel 31 which is of an integral form. The dash panel 31 has an upper portion 31a which is inclined forward at the intermediate portion and rearward at the opposite end portions as in the previous embodiment. A reinforcement 32 of a channel shaped cross-section is welded to the upper portion 31a of the dash panel 31. The upper portion 31a has an upper edge portion 31b which is bent rearward and a bracket 33 is welded to the upper edge portion 31b. A windshield glass 10 has a lower edge portion 10a attached to the bracket 33 by means of an adhesive 34. A moulding 35 is attached to the bracket 33 by means of clips 36 of a conventional structure.

The bracket 33 is formed with the forwardly extended flange 33a to which a rain rail or cowl panel 37 is attached. As shown in FIG. 7, the cowl panel 37 is removably attached at the rear edge portion, to the flange 33a of the bracket 33 by means of screws 38 and screw grommet 39. At the opposite end portions, the cowl panel 37 is attached to the wheel aprons (not shown) by means of screws 40. With the arrangement described above, it is possible to provide a better access to the engine compartment A by removing the cowl panel 37.

Referring now to FIGS. 8 through 11, the embodiment shown therein includes a dash panel 1 which comprises a lower panel section 9 and an upper panel section 8 which are welded together as in the first embodiment. The upper panel section 8 is inclined forward at the intermediate portion and rearward at the opposite end portions. The upper panel section 8 has an upper portion 8b which is bent rearward and to which a rain rail panel 41 is welded at the rear edge portion thereof. A reinforcement 11 is welded to the upper panel section 8. The upper panel section 8 is formed with an air hole 19 as in the first embodiment.

An air box 42 is provided beneath the rain rail panel 41 and attached to the rain rail 41 and the upper panel section 8 so that the inside space of the air box 42 is communicated with the space in the reinforcement 11 through the air hole 19. The rain rail panel 41 is formed with an air inlet hole 43 which communicates with the space in the air box 42.

In order to install the air box 42 on the upper panel section 8 and the rain rail panel 41, the panel 41 is provided with a plurality of hooks 44 which are adapted to engage the upper flange 42a of the air box 42. The air box 42 is further provided with a pair of lugs 42b on the opposite side walls. The upper panel section 8 is provided at the front surface with a pair of nut plates 45 at the opposite sides of the air hole 19. The air box 42 is installed on the panels 8 and 41 by having the flange 42a engaged with the hooks 44 on the panel 41 and inserting screws 46 through the lugs 42b into the nut plates 45. In order to properly locate the air box 42 on the panel 8, the air box 42 is formed with locating flanges 42c at the rear ends of the side walls. The upper panel section 8 of the dash panel 1 is formed with pairs of beads 47 so that the air box 42 can be properly located by positioning the locating flanges 42c between the beads 47 of the respective pairs.

Referring to FIG. 12, the embodiment shown therein includes a dash panel 1 comprising a lower panel section 9 and an upper panel section 8 which are welded together at the edge portions 9a and 8a as in the first embodiment. The configuration of the upper panel section 8 is substantially the same as that in the first embodiment. Further, reinforcements 11 and 13 are attached to the panel section 8 as in the first embodiment. The panel section 8 has an upper edge portion 8b which is bent rearward.

The rain rail panel or cowl panel 50 is welded at the rear edge portion to the upper edge portion 8b of the panel section 8. A wiper support bracket 51 is provided beneath the cowl panel 50 and welded to the cowl panel 50 and the upper panel section 8 of the dash panel 1 at a position opposite to the reinforcement 13 with respect to the panel section 8. A wiper 52 is supported by the cowl panel 50 and the bracket 51.

The invention has thus been shown and described with reference to specific embodiments, however, it should be noted that the invention is in no way limited to the details of the illustrated structures but changes and modifications may be made without departing from the scope of the appended claims.

We claim:

1. A motor vehicle front body structure including an engine compartment and a passenger compartment located rearward of the engine compartment, a substantially vertical, transversely extending dash panel separating the engine compartment from the passenger compartment, a front windshield disposed above said dash panel and defining an upper front part of the passenger compartment, said front windshield being, in a horizontal section, of a forwardly convex configuration, said dash panel having a substantially planar lower portion and an upper portion which extends upward from said lower portion, said upper portion being inclined forward at a transversely intermediate part so that an upper edge of said upper portion located at said transversely intermediate part is located forward of said lower portion, said upper edge of said upper portion being inclined rearward at transversely opposite side parts so that said transversely opposite side parts of said upper edge are located rearward of said lower portion, means for supporting a lower edge portion of said windshield on said upper portion of the dash panel.

2. A front body structure in accordance with claim 1 which further includes a reinforcement located rearward the dash panel and connected to an upper portion of the dash panel to form a transversely extending structure of closed cross section.

3. A front body structure in accordance with claim 2 which includes a plurality of web members located in said transversely extending structure of closed in said transversely extending structure of closed cross-section at transversely spaced apart positions and connected to the reinforcement and the dash panel.

4. A front body structure in accordance with claim 2 in which said upper portion of the dash panel has an upper edge portion which is bent substantially rearwards, a second reinforcement being provided between the upper edge portion of the dash panel and the first mentioned reinforcement.

5. A front body structure in accordance with claim 4 in which said front windshield has a lower edge of forwardly convex curvature, said lower edge of the windshield being supported on the rearwardly bent upper edge portion of the dash panel.

6. A front body structure in accordance with claim 4 which further includes a wiper supporting bracket located forward and connected to an upper portion of the dash panel at a position opposite to the second reinforcement with respect to the dash panel.

7. A front body structure in accordance with claim 1 in which said dash panel includes a lower panel section of a substantially planar configuration and an upper panel section which is secured at a lower edge portion to said lower panel section.

8. A front body structure in accordance with claim 1 which includes a cowl panel which extends forward from an upper edge portion of the dash panel to cover an upper rear portion of the engine compartment.

9. A front body structure in accordance with claim 8 in which a bracket is secured to the upper edge portion of the dash panel, said cowl panel being removably attached to said bracket.

10. A front body structure in accordance with claim 8 in which a windshield moulding is provided between the cowl panel and the front windshield.

11. A front body structure in accordance with claim 8 in which said cowl panel is formed with an air intake opening, an air box being provided beneath the cowl panel and connected with an upper portion of the dash panel to draw air through the air intake opening.

12. A front body structure in accordance with claim 11 in which means is provided for locating the air box on the dash panel.

13. A front body structure in accordance with claim 1 in which said dash panel is formed at an upper portion with an air box which is located in the engine compartment.

14. A front body structure in accordance with claim 13 which includes a reinforcement located rearward the dash panel and connected to an upper portion of the dash panel to form a transversely extending structure of close cross-section, said dash panel being formed with an air opening which connects an inside space of the air box with an inside space of the reinforcement.

15. A front body structure in accordance with claim 13 which includes at least two web members which are located in the transversely extending structure of closed cross-section at the opposite sides of the air opening in the dash panel, said reinforcement having a bottom wall formed with an air outlet opening located between the web members.

16. A motor vehicle front body structure including an engine compartment and a passenger compartment located rearward of the engine compartment, a substantially vertical, transversely extending dash panel separating the engine compartment from the passenger compartment, a front windshield disposed above said dash panel and defining an upper front part of the passenger compartment, said front windshield being, in a horizontal section, of a forwardly convex configuration, said dash panel having a substantially planar lower portion and an upper portion which extends upward from said lower portion, said upper portion being inclined forward at a transversely intermediate part so that an upper edge of said upper portion located at said transversely intermediate part is located forward of said lower, portion, said upper edge of said upper portion being inclined rearward at transversely opposite side parts so that said transversely opposite side parts of said upper edge are located rearward of said lower portion, means for supporting a lower edge portion of said windshield on said upper portion of the dash panel, a reinforcement located at a side of the dash panel facing the passenger compartment and connected to an upper portion of the dash panel to form a transversely extending structure of closed cross-section.

* * * * *